United States Patent Office 3,442,863
Patented May 6, 1969

3,442,863
OXYMETHYLENE POLYMERS CONTAINING UNITS DERIVED FROM CHLORINATED AROMATIC GLYCOLS AND ALDEHYDES
Manuel Slovinsky, Fanwood, N.J., assignor to Celanese Corporation, a corporation of Delaware
No Drawing. Filed June 10, 1964, Ser. No. 374,146
Int. Cl. C08g 23/00
U.S. Cl. 260—67          3 Claims

ABSTRACT OF THE DISCLOSURE

This disclosure contains descriptions of fire resistant polyacetals and oxymethylene copolymers prepared from diols having a depending hetero substituent such as a halogen, nitro, cyano, alkoxy, or keto oxygen substituent.

---

This invention relates to the production of polymeric acetals and relates more particularly to the production of polyformals containing substituted aromatic units and of polyoxymethylene copolymers containing such units.

It is an object of this invention to produce novel polymeric products useful for the production of molded products and other shaped articles.

Another object of this invention is the production of new fire resistant plastics.

Other objects of this invention will be apparent from the following detailed description and claims. In this description and claims all proportions are by weight unless otherwise indicated.

In accordance with one aspect of this invention there are produced polymeric acetals, including formals, of dihydric alcohols having depending hetero substituents. Such hetero substituents may be halogen, such as chlorine, bromine, fluorine, or iodine, or they may be nitro ($NO_2$), cyano (—CN) alkoxy or ketone, for example.

In accordance with another aspect of this invention polymeric acetals made from aldehydes of at least two carbon atoms, said polymeric acetals having individual

units (where R is a monovalent radical having its valence attached to a carbon atom of said radical) directly connected to —O—Z—O units (where HO—Z—OH is a dihydric alcohol having at least two directly connected carbon atoms), are reacted with trioxane or other cyclic oligomer of formaldehyde to produce polyoxymethylene copolymers containing individual

units (where R has the meaning specified above).

Dihydric alcohols having depending hetero substituents include such compounds as the chlorinated aromatic glycols, e.g., mono- di- tri- or tetra-chloro-xylylene-glycol; 1-ethoxy-xylylene glycol 2,4; 1-nitro-xylylene glycol 2,4; monocyanoalkoxy-substituted glycols such as β-cyano-ethoxy butanediol-1,4; ketone-containing alcohols such as dihydroxymethylacetone; trifluoromethyl-substituted glycols such as trifluoromethyl xylylene glycols; other halogenated glycols such as glycols of the type $$HOCH_2(CF_2)_nCH_2OH$$

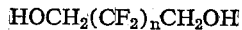 (2,3-dibromo but-2-ene-1,4-diol), and $HOCH_2CCl_2CCl_2CH_2OH$.

Other dihydric alcohols which may be employed are ethylene glycol, xylylene glycol, dihydroxyethyl adipate, tetramethyl cyclobutanediol, cyclohexanedimethanol, cyclohexanediol (quinitol), neopentyl glycol, bishydroxy methyl mesitylene, bishydroxymethyl durene, bishydroxymethyl isodurene.

Aldehydes suitable for use in the production of the polyacetals include formaldehyde (which may be supplied as paraformaldehyde or as a monomeric formal, e.g., dibutyl formal), chloral, and halobenzaldehydes such as p-chlorobenzaldehyde, o-chlorobenzaldehyde, 2,4 dichlorobenzaldehyde, 3,4-dichlorobenzaldehyde.

A typical reaction using paraformaldehyde can be represented by the following equation:

$$HO-Z-OH + (CH_2O)_n \rightarrow (CH_2-O-Z-O)_m + H_2O$$

where $(CH_2O)_n$ represents paraformaldehyde, $$HO-Z-OH$$

represents a dihydric alcohol and $m$ is a number (e.g., above 10) representing the degree of polymerization of the resulting polyformal. When higher aldehydes are used one of the hydrogens of the $CH_2O$ is replaced by an R radical (described previously) in the above equation.

After the formation of the polyacetal it may be reacted with trioxane or with another cyclic oligomer of formaldehyde, such as tetraoxymethylene, to produce a polymer in which there are polyoxymethylene blocks interspersed with other units, e.g., $$-(CH_2O)_x-Z-O-(CH_2O)_y-Z-$$

or

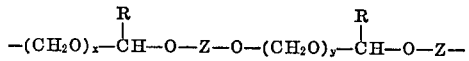

where $x$ and $y$ are each greater than one, e.g., two to 1000 or higher. This reaction is hereinafter termed a "redistribution reaction."

The production of the polyacetal is usually effected in the presence of an acid-reacting condensation-catalyst such as an alkane sulfonic acid, e.g., methane-sulfonic acid or higher homologues thereof; other sulfonic acids such as p-toluene sulfonic acid, camphosulfonic acids, polysulfonic acids like methane di- or tri-sulfonic acid, and naphthalene sulfonic acid; acid-acting salts, e.g., ferric chloride, boron trifluoride and complexes thereof such as the dibutyl etherate or other etherates, stannic chloride; mineral acids such as sulfuric and hydrochloric acids; and other Lewis acids. The proportion of catalyst used is generally below 1% of the reaction mixture, preferably in the range of about 0.1 to 0.7%. When the acetal units are provided by a monomeric or polymeric aldehyde (e.g., paraformaldehyde), the water of reaction is conveniently removed, as by continuous azeotropic distillation in the presence of an inert solvent such as a hydrocarbon, which may be aromatic (e.g., benzene, toluene or xylene), cycloaliphatic (e.g., cyclohexane or methyl cyclohexane) or aliphatic (e.g., hexane, pentane, or octane).

After substantial polymerization has taken place, as shown by a thickening of the reaction mixture, the solvent may be removed entirely from the now-viscous mixture (as by distillation at subatmospheric pressure) and the degree of polymerization of the polyacetal may be increased, if desired, by further heating favoring the elimination of volatile products. Thus, the further heating may be effected at a low pressure, preferably below about 100 mm. Hg A (e.g., in the range of about 0.1 to 5 mm. Hg A), or in flowing inert atmosphere as by passing a stream of nitrogen, which may be at atmospheric pressure, over the material being heated. The temperature in this chain-extension stage is preferably a few degrees below the melting point.

Instead of using a monomeric or polymeric aldehyde as the starting material in the production of the polyformal one may use a monomeric acetal to supply the —CH₂O— or —CHRO— groups without the formation of water of reaction. Particularly suitable are dialkyl acetals such as the formals or other acetals of alkanols having 1 to 10 carbon atoms, e.g., di-n-butyl formal, or formals or other acetals of other alcohols which are of sufficient volatility to be readily driven off during or after the partial polymerization of the polyformal, and prior to the further polymerization or chain extension of the polyformal.

The redistribution reaction, discussed previously, may be carried out in the manner described in Belgian Patent 625,781, or Belgian Patent 624,203 (corresponding to S. African Patent 4,468/62). In this reaction the catalyst is advantageously a trioxane polymerization catalyst, preferably a cationic catalyst. Particularly good results are obtained when the catalyst is boron fluoride, as such or in the form of a complex thereof with an ether or in the form of an activatable aryldiazonium fluoborate, but any of the other catalysts set forth in the aforementioned Belgian patents may be employed. The proportion of catalyst may advantageously be in the range of about 10 to 1000 parts per million, based on the weight of cyclic oligomer. The reaction is preferably carried out in the liquid state, e.g., in molten trioxane or in solution in an inert solvent; any of the reaction techniques and conditions described in the aforementioned Belgian patents may be used. Advantageously, the reaction temperature is in the range of about −70 to +150° C., preferably in the range of about 50 to 90° C., and the reaction mixture is substantially anhydrous.

The oxymethylene copolymers produced by the redistribution reaction generally contain relatively unstable terminal hydroxy oxymethylene groups (—OCH₂OH) generally at the end of a polyoxymethylene chain; e.g., —OCH₂—OCH₂—OCH₂OH or O—)CH₂O)$_n$H. These may be removed, to improve the stability of the product, by suitable thermal treatment, preferably by reaction with water or an alcohol. A suitable thermal treatment is that described in U.S. Patent 3,103,499 while a suitable thermal treatment in the presence of water or an alcohol is disclosed in Indian Patent 76,364 (corresponding to French Patent 1,287,151). Alternatively the unstable end groups may be stabilized by treatment with suitable "end-capping" reagents which convert the hydroxyl groups to more resistant groups, such as ester groups (produced by reaction with acid anhydrides, e.g., acetic anhydride to form acetate end groups) or ether groups (as by reaction with dimethylsulfate to form methyl ether end groups).

The oxymethylene copolymers obtained from redistribution reaction may be mixed with suitable stabilizers of a type well known to the art. Among such stabilizers are antioxidants, such as phenolic compounds, and particularly alkylene bis phenols, as well as, or together with, amidines such as cyanoguanidine, melamine or N-diethylmelamine; polyamides such as the synthetic linear polyamides, e.g., nylons; or epoxy compounds such as the condensation product of epichlorhydrin and bis phenol-A.

The polymeric products obtained in accordance with this invention may be molded, as by injection or compression molding, to produce useful shaped articles, e.g., toys, cups, automobile parts, containers, etc., may be cast or extruded to produce films suitable for wrapping or packaging purposes, and may be melt-spun, or dry-spun from solution, to produce useful textile fibers.

The following examples are given to illustrate this invention further.

EXAMPLE I 13.8 parts of 2,3,5,6-tetrachloro-α,α′-xylyleneglycol

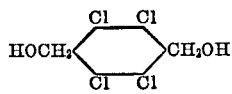

1.9 parts of paraformaldehyde, 50 parts of chlorobenzene and 0.1 part of methanesulfonic acid were mixed and stirred at 85° C. for 2.5 hrs. The temperature was next increased to 150° C. whereby water was removed azeotropically (Dean-Stark trap) for 3 hours. 0.3 part of paraformaldehyde were then added and the temperature maintained at 100° C. for one hour followed by a refluxing period of 2 hours. The solvent was next removed by gradually heating up to 275° C. and applying vacuum up to 1 mm. Hg A. Part of the crude product left was extracted in a Sohxlet apparatus with chlorobenzene for 7 hours. The residue was a polyformal with a crystalline melting point (disappearance of birefringence) of 348° C. The remainder of the solid crude product was heated at 300–307° C. and 1 mm. Hg A for 3 hours, extracted with chlorobenzene as before and dried in a vacuum oven at 100° C. The product was a polyformal of the formula

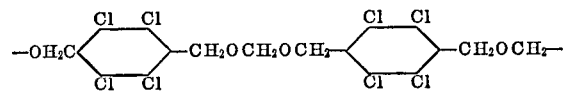

It was birefringent, had a crystalline melting point (disappearance of birefringence) of 365° C. and did not sustain combustion when ignited in a flame and then removed from the flame.

This polyformal was found to be soluble in benzophenone at 240° C. It melted without apparent decomposition.

EXAMPLE II 41.4 g. of 2,3,5,6-tetrachloro xylene-α,α′-diol 26.25 g. of 2,4-dichloro benzaldehyde, 200 ml. of chlorobenzene, 50 ml. of benzene and 0.2 g. of methanesulfonic acid were refluxed at 112° C. for 24 hours, while reaction water was removed in a Dean-Stark trap. Solvents and unreacted materials were removed by heating under vacuum up to a temperature of 220° C. The product left was dissolved in benzene and precipitated in methanol, and dried overnight in a vacuum oven at 60° C. The resulting polyacetal, of the formula

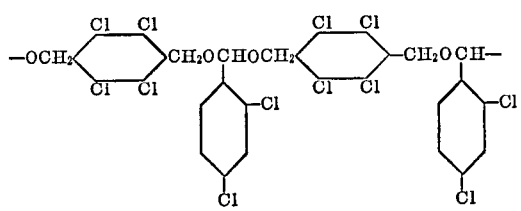

was white and when its solubility in benzene, dioxane, chloroform and methylene chloride was tested at the boiling point of the solvent it dissolved in each solvent and stayed in solution at room temperature. Its softening range, for transition to a free flowing viscous liquid, was 121–140° C. Elemental analysis showed a chlorine content of 47.5% and a carbon content of 41.2–41.7%. The I.V. of the polyacetal was 0.03%; this was measured in a 0.1% solution in benzene at 25° C.; but despite this low I.V. long fibers could be drawn from the melt. The polyacetal did not sustain combustion when ignited in a flame and then removed from the flame.

EXAMPLE III 10 parts of the polyacetal product in Example II was mixed with 40 parts of redistilled trioxane and 44 parts of benzene to form a solution at a temperature of 55–65° C. To this solution was added 100 p.p.m. (based on the weight of the total reaction mixture) of boron trifluoride; this was added in the form of boron fluoride dibutyl etherate. The mixture was stirred for 5 hours at a temperature of 56–65° C. and then tributylamine was added to stop the reaction. After washing two times with methanol in a Waring blendor, the product was dried in a vacuum oven. The dried polymer product, obtained in 74% yield, was then given an alkaline thermal treatment in which there was refluxed for one hour at 160–170° C. a solution of 10 grams of the polymer, 50 ml. benzyl alcohol, 50 ml. dimethylacetamide and 0.1 ml. tributylamine. After allowing the temperature to go down to 60–70° C., the mixture was poured on methanol and washed in a Waring blendor three times, and dried in a vacuum oven. It was found that the loss of weight due to this treatment was 19%. The treated product had an I.V. of 0.4, when measured in a 0.1% solution in a mixture of 98% p-chlorophenol and 2% α-pinene at a temperature of 60° C. Elemental analysis showed its carbon content was 39.55% and its chlorine content was 9.15%. Infrared analysis showed that the tetrachloro p-xylene glycol moiety and the 2,6 dichloro benzaldehyde moiety were present.

The treated product was mixed with stabilizers, more particularly with 0.5% of a bis-phenol, and 0.1% of cyanoguanidine by soaking the polymer in a methanol solution containing the stabilizers, evaporating the methanol and extruding the polymer, as a rod, through a small orifice at about 170° C. The resulting stabilized mixture showed a weight loss of 2.25% when maintained at 230° C. for 45 minutes in an open vessel.

The product of this example was a copolymer containing polyoxymethylene units, —$CH_2OCH_2O$—, tetrachloroxylylene units

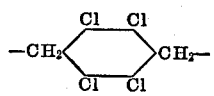

and dichlorobenzal units

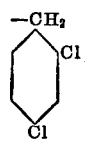

all united by C—O—C bonds.

EXAMPLE IV 41.4 parts of 2,3,5,6 tetrachloro-α,α'-xylylene glycol, 26.3 parts of 2,5 dichlorobenzaldehyde, 200 parts of chlorobenzene, 50 parts of benzene and 0.2 part (0.3% by weight) methane sulfonic acid were added together and refluxed for 48 hours. Another 0.2 part methane sulfonic acid was added after 24 hours. A very slow water removal occurred and 89% of the theoretical water had been collected after this period of reflux. The solvents were distilled off at atmospheric pressure (benzene B.P. 80° C. chlorobenzene 140° C.). The temperature was then raised gradually to 270° C. at a pressure of 0.25 mm. of Hg. These conditions were held for three hours after which the resulting polymer was cooled to room temperature, dissolved in benzene and reprecipitated into methanol. A 69% yield of polymer was obtained with a softening point of 135–140° C. and an I.V. of 0.13 (0.1% conc. in benzene at 25° C.). Elemental analysis was as follows. Observed: C, 41.6%; H, 2.2%; Cl, 46.2%. Calc.: C, 41.6%; H, 1.8%; Cl, 49.2%.

3 parts of trioxane (previous distilled over sodium hydroxide and sodium) and 2 parts of the polyformal obtained above were dissolved in benzene at 65° C. and boron trifluoride diethyl etherate was added (250 p.p.m. BF$_3$). After three hours, a gel remained which was extracted with methanol containing a trace of tributyl amine and then with benzene. A 33% yield of polymer resulted. Thereafter alkaline treatment was carried out as in Example III. The loss of weight due to the treatment was only 3%.

The treated product had a crystalline melting range of 170–200° C.; that is, its birefringence began to disappear at 170° C. and the last trace of birefringence disappeared at 200° C. Its I.V. (measured as in Example III) was 0.13 and its chlorine content was 37.7%. Calculations, based on elemental analysis showed that its content of $CH_2O$ (derived from trioxane) was 23.5%. The product, after blending with stabilizers, showed the same weight loss at 230° C. as the product of Example III.

The product, tested without the stabilizers, would not support combustion when ignited by a flame and then removed from the flame.

The product without the stabilizers was blended with 5% of its weight of $Sb_2O_3$ by tumbling in a jar on a roll mill. The resulting blend would not burn even in a flame.

The product of this example was a copolymer containing polyoxymethylene units —$CH_2OCH_2O$—, tetrachloroxylylene units

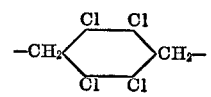

and dichlorobenzal units

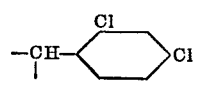

all united by C—O—C bonds, but its content of oxymethylene units was less than that of Example III.

Fillers and pigments may be incorporated into the polymers of the invention. These may be of the usual types. As shown in Example IV above, the incorporation of an antimony oxide improves the fire resistance of polymers containing halogen atoms. The proportion of the antimony oxide may, for example, be in the range of about 2 to 15%. The pigments or fillers may be incorporated in any suitable manner as by milling them into the polymer at elevated temperature.

The chlorine analysis was run by a standard method consisting of burning the sample in a Shoniger flask absorbing the combustion gases in an alkaline solution and titrating chlorine ion potentiometrically with a silver nitrate solution.

Carbon and hydrogen determinations were carried out by classic conventional micro method consisting of burning the sample in an oxygen atmosphere, carrying the vapors over a hot combustion catalyst made of copper oxide and platinum and absorbing and weighing the $CO_2$ and $H_2O$ produced.

It is to be understood that the foregoing detailed description is given merely by way of illustration, and that variations may be made therein without departing from the spirit of this invention.

The embodiments of the invention in which an exclusive property or privilege is claimed are defined as follows:

1. An oxymethylene polymer having improved fire resistance, said polymer consisting essentially of recurring oxymethylene units in major amounts and, interspersed therewith, hetero substituent-bearing units selected from the group consisting of those having the structural formulas

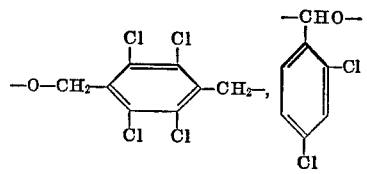

and mixtures of said hetero substituent-bearing units.

2. The polymer as described in claim 1 consisting essentially of oxymethylene units interspersed with units of the formula

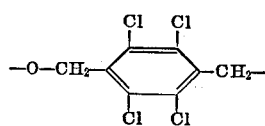

3. The polymer as described in claim 1 consisting essentially of oxymethylene units interspersed with units of the formula
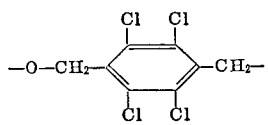
and
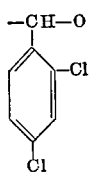
References Cited
UNITED STATES PATENTS
| | | | |
|---|---|---|---|
| 2,870,097 | 1/1959 | Pattison | 260—2 |
| 2,968,646 | 1/1961 | Caldwell et al. | 260—67 |
| 3,133,046 | 5/1964 | England | 260—63 |
| 3,256,246 | 6/1966 | Gutweiler et al. | 260—67 |
| 3,068,294 | 12/1962 | Rosen et al. | |
| 3,252,939 | 5/1966 | Small. | |
WILLIAM H. SHORT, *Primary Examiner.*
L. M. PHYNES, *Assistant Examiner.*
U.S. Cl. X.R.
260—611, 831, 833, 838, 841, 45.9, 45.95